US012110004B2

(12) United States Patent
Aratake et al.

(10) Patent No.: US 12,110,004 B2
(45) Date of Patent: Oct. 8, 2024

(54) CONTROL APPARATUS FOR HYBRID ELECTRIC VEHICLE

(71) Applicant: TOYOTA JIDOSHA KABUSHIKI KAISHA, Toyota (JP)

(72) Inventors: Hironobu Aratake, Chiryu (JP); Yoshiaki Tsuruta, Nagakute (JP); Yoshio Hasegawa, Chiryu (JP); Takahiko Tsutsumi, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 337 days.

(21) Appl. No.: 17/581,561

(22) Filed: Jan. 21, 2022

(65) Prior Publication Data

US 2022/0227350 A1 Jul. 21, 2022

(30) Foreign Application Priority Data

Jan. 21, 2021 (JP) ................................. 2021-008334

(51) Int. Cl.
*B60W 20/00* (2016.01)
*B60K 6/52* (2007.10)
(Continued)

(52) U.S. Cl.
CPC .............. *B60W 20/30* (2013.01); *B60K 6/52* (2013.01); *B60W 10/06* (2013.01); *B60W 10/08* (2013.01); *B60W 10/10* (2013.01); *B60W 10/119* (2013.01); *B60W 50/14* (2013.01); *B60W 2520/04* (2013.01); *B60W 2540/10* (2013.01);
(Continued)

(58) Field of Classification Search
CPC .... B60W 10/06; B60W 10/08; B60W 10/119; B60W 10/26; B60W 20/30; B60W 20/15; B60W 20/14; B60W 30/182; B60W 50/08
See application file for complete search history.

(56) References Cited

U.S. PATENT DOCUMENTS 6,338,391 B1 * 1/2002 Severinsky ........... B60W 10/08
180/65.23
6,554,088 B2 * 4/2003 Severinsky .............. B60K 6/22
180/65.23

(Continued)

FOREIGN PATENT DOCUMENTS

JP 2016-179780 A 10/2016

*Primary Examiner* — Gonzalo Laguarda
(74) *Attorney, Agent, or Firm* — Oliff PLC

(57) ABSTRACT

A control apparatus for a hybrid electric vehicle includes: an engine control portion for controlling an operation state of an engine; and a driving-mode control portion for controlling the vehicle so as to realize selected at least one of driving modes. The driving modes include a low-gear all-wheel driving mode and a high-gear all-wheel driving mode. In a case in which the low-gear all-wheel driving mode is selected in the high-gear all-wheel driving mode when the engine is in a stopped state with a vehicle power transmission apparatus being in a non-driving position that disables transmission of a drive power, the engine control portion maintains the stopped state of the engine until completion of switching from the high-gear all-wheel driving mode to the low-gear all-wheel driving mode, and starts the engine after the completion of the switching from the high-gear all-wheel driving mode to the low-gear all-wheel driving mode.

12 Claims, 4 Drawing Sheets

(51) Int. Cl.
*B60W 10/06* (2006.01)
*B60W 10/08* (2006.01)
*B60W 10/10* (2012.01)
*B60W 10/119* (2012.01)
*B60W 20/30* (2016.01)
*B60W 50/14* (2020.01)

(52) U.S. Cl.
CPC ... *B60W 2540/215* (2020.02); *B60W 2710/06* (2013.01); *B60W 2710/083* (2013.01); *B60W 2710/10* (2013.01); *B60W 2720/403* (2013.01); *B60Y 2200/92* (2013.01); *B60Y 2400/82* (2013.01)

(56) References Cited

U.S. PATENT DOCUMENTS

| | | | | |
|---|---|---|---|---|
| 6,685,591 B2 * | 2/2004 | Hanyu | ................ | B60K 6/52 903/905 |
| 2022/0227348 A1 * | 7/2022 | Aratake | ............ | B60W 10/11 |
| 2022/0227350 A1 * | 7/2022 | Aratake | ............ | B60W 10/10 |

* cited by examiner

CONTROL APPARATUS FOR HYBRID ELECTRIC VEHICLE

This application claims priority from Japanese Patent Application No. 2021-008334 filed on Jan. 21, 2021, the disclosure of which is herein incorporated by reference in its entirety.

FIELD OF THE INVENTION

The present invention relates to a control apparatus for a hybrid electric vehicle that includes an engine and an electric motor.

BACKGROUND OF THE INVENTION

There is well-known a control apparatus or a drive apparatus for a hybrid electric vehicle that includes an engine, an electric motor, main and auxiliary drive wheels, a drive-power distribution device configured to distribute a drive power to the main and auxiliary drive wheels, and a transmission provided in the drive-power distribution device and configured to establish a selected one of a low gear position and a high-gear position. A drive apparatus for a hybrid electric vehicle described in JP2016-179780A is an example of such a drive apparatus. This Japanese Patent Application Publication discloses driving modes including a first mode and a second mode, wherein a power performance is more important than an energy efficiency in the second mode as compared with in the first mode, and wherein the engine is started if the engine is in its stopped state when the second mode is selected by a driver of the vehicle. The Japanese Patent Application Publication further discloses a transfer low driving mode that belongs to the second mode. In the transfer low driving mode, the vehicle runs with a low gear position being established in a transmission provided in a transfer as the drive-power distribution device.

SUMMARY OF THE INVENTION

By the way, when the vehicle driver selects a low-gear all-wheel driving mode in which the low gear position is to be established in the transmission provided in the drive-power distribution device, there is a possibility that the vehicle driver does not necessarily have an intention to start the engine. Therefore, if the engine is started immediately when the low-gear all-wheel driving mode is selected, there is a risk that a sense of discomfort could be given to the vehicle driver. Further, if the engine is started immediately when the low-gear all-wheel driving mode is selected, there is a possibility that switching to the low-gear all-wheel driving mode could be executed concurrently with starting of the engine, thereby causing a shock in the hybrid electric vehicle and accordingly causing a risk that the sense of discomfort could be given to the vehicle driver.

The present invention was made in view of the background art described above. It is therefore an object of the present invention to provide a control apparatus for a hybrid electric vehicle, which is capable of making the vehicle driver hardly feel uncomfortable when the low-gear all-wheel driving mode is selected.

The object indicated above is achieved according to the following aspects of the present invention.

According to a first aspect of the invention, there is provided a control apparatus for a hybrid electric vehicle that includes an engine, an electric motor, main and auxiliary drive wheels and a vehicle power transmission apparatus configured to transmit a drive power toward the main and auxiliary drive wheels, the vehicle power transmission apparatus including a drive-power distribution device configured to distribute the drive power to the main and auxiliary drive wheels, and a transmission provided in the drive-power distribution device and configured to establish a selected one of a low gear position and a high-gear position, the control apparatus comprising: an engine control portion configured to control an operation state of the engine; and a driving-mode control portion configured to control running of the vehicle so as to realize selected at least one of driving modes which is selected by a driver of the vehicle, wherein the driving modes include an all-wheel driving mode in which the vehicle is to run with the drive power being distributed to the main drive wheels and the auxiliary drive wheels, the all-wheel driving mode being categorized into a low-gear all-wheel driving mode in which the low gear position is established in the transmission and a high-gear all-wheel driving mode in which the high gear position is established in the transmission, and wherein, in a case in which the low-gear all-wheel driving mode is selected in the high-gear all-wheel driving mode when the engine is in a stopped state with the vehicle power transmission apparatus being in a non-driving position that disables transmission of the drive power, the engine control portion is configured to maintain the stopped state of the engine until completion of switching from the high-gear all-wheel driving mode to the low-gear all-wheel driving mode by the driving-mode control portion, and to start the engine after the completion of the switching from the high-gear all-wheel driving mode to the low-gear all-wheel driving mode. It is noted that the driving-mode control portion may be defined also as a control portion configured to control a vehicle power transmission apparatus (that is described below) so as to realize selected at least one of driving modes which is selected by a driver of the vehicle or which is automatically selected.

According to a second aspect of the invention, in the control apparatus according to the first aspect of the invention, the engine control portion is configured to start the engine, after a switching operation is executed, by the driver of the vehicle, for switching from a state for selecting the non-driving position of the vehicle power transmission apparatus, to a state for selecting a driving position of the vehicle power transmission apparatus that enables the transmission of the drive power.

According to a third aspect of the invention, in the control apparatus according to the first aspect of the invention, the engine control portion is configured to start the engine, after a switching operation and an acceleration requesting operation are executed by the driver of the vehicle, the switching operation being executed for switching from a state for selecting the non-driving position of the vehicle power transmission apparatus, to a state for selecting a driving position of the vehicle power transmission apparatus that enables the transmission of the drive power, the acceleration requesting operation being executed for increasing the drive power after execution of the switching operation.

According to a fourth aspect of the invention, in the control apparatus according to the second or third aspect of the invention, the engine control portion is configured to not initiate starting of the engine in process of switching of the power transmission apparatus from the non-driving position to the driving position in response to the switching operation.

According to a fifth aspect of the invention, in the control apparatus according to the first aspect of the invention, there is further provided an electric-motor control portion that is configured to cause the electric motor to output a predetermined torque causing a creep phenomenon in the high-gear all-wheel driving mode when the engine is in the stopped state, wherein the driving-mode control portion executes switching from the high-gear all-wheel driving mode to the low-gear all-wheel driving mode with the engine being kept in the stopped state, by switching the transmission from the high gear position to the low gear position by operation of a dog clutch provided in the transmission in a state in which the predetermined torque is outputted from the electric motor.

According to a sixth aspect of the invention, in the control apparatus according to the first aspect of the invention, the engine control portion is configured to inhibit switching of the engine from an operated state to the stopped state in the high-gear all-wheel driving mode and in the low-gear all-wheel driving mode.

According to a seventh aspect of the invention, in the control apparatus according to the first aspect of the invention, the driving modes include a high-gear main-drive-wheel driving mode in which the vehicle is to run with the drive power being distributed to the main drive wheels, with the high gear position being established in the transmission, wherein the driving-mode control portion is configured, when the low-gear all-wheel driving mode is selected in the high-gear main-drive-wheel driving mode with the engine being in the stopped state, to not switch from the high-gear main-drive-wheel driving mode to the low-gear all-wheel driving mode, and to switch from the high-gear main-drive-wheel driving mode to the high-gear all-wheel driving mode with the engine being kept in the stopped state.

According to an eighth aspect of the invention, in the control apparatus according to the seventh aspect of the invention, there is further provided a notification control portion configured, when the low-gear all-wheel driving mode is selected in the high-gear main-drive-wheel driving mode, to notify the driver of the vehicle that switching to the high-gear all-wheel driving mode has been executed, and to suggest the drive of the vehicle to switch from selection of the low-gear all-wheel driving mode to selection of the high-gear all-wheel driving mode.

In the control apparatus according to the first aspect of the invention, in the case in which the low-gear all-wheel driving mode is selected in the high-gear all-wheel driving mode when the engine is in the stopped state with the vehicle power transmission apparatus being in the non-driving position that disables transmission of the drive power, the engine control portion is configured to maintain the stopped state of the engine until the completion of the switching from the high-gear all-wheel driving mode to the low-gear all-wheel driving mode by the driving-mode control portion, and to start the engine after the completion of the switching from the high-gear all-wheel driving mode to the low-gear all-wheel driving mode. This control arrangement makes it possible to start the engine while preventing generation of a shock, by avoiding the switching to the low-gear all-wheel driving mode and the starting of the engine from being executed concurrently with each other. It is therefore possible to make the driver of the vehicle hardly feel uncomfortable when the low-gear all-wheel driving mode is selected.

In the control apparatus according to the second aspect of the invention, the engine is started after the switching operation is executed, by the driver of the vehicle, for switching from the state for selecting the non-driving position of the vehicle power transmission apparatus, to the state for selecting the driving position of the vehicle power transmission apparatus. Thus, the engine is started in response to the operation of the vehicle driver which leads to starting of the engine, thereby making the driver of the vehicle hardly feel uncomfortable. Further, the engine can be started prior to an acceleration requesting operation or other operation for causing the vehicle to actually run, thereby making it possible to improve a drivability.

In the control apparatus according to the third aspect of the invention, the engine is started after the switching operation and the acceleration requesting operation are executed by the driver of the vehicle, wherein the switching operation is executed for switching from the state for selecting the non-driving position of the vehicle power transmission apparatus, to the state for selecting the driving position of the vehicle power transmission apparatus, and wherein the acceleration requesting operation is executed for increasing the drive power after execution of the switching operation. Thus, the engine is started in response to the operation of the vehicle driver which leads to starting of the engine, thereby making the driver of the vehicle hardly feel uncomfortable. Further, the stopped state of the engine is maintained until execution of the operation for causing the vehicle to actually run, whereby an energy efficiency is improved.

In the control apparatus according to the fourth aspect of the invention, the starting of the engine is not initiated in the process of the switching of the power transmission apparatus from the non-driving position to the driving position in response to the switching operation, so that it is possible to avoid the switching of the power transmission apparatus from the non-driving position to the driving position and the starting of the engine from being executed concurrently with each other, and accordingly to prevent generation of the shock.

In the control apparatus according to the fifth aspect of the invention, the switching from the high-gear all-wheel driving mode to the low-gear all-wheel driving mode is executed with the engine being kept in the stopped state, by switching the transmission from the high gear position to the low gear position by operation of the dog clutch provided in the transmission in the state in which the predetermined torque is outputted from the electric motor. Therefore, the rotation of the electric motor makes it easier to obtain rotation required by the operation of the dog clutch, so that it is possible to reliably execute the switching from the high-gear all-wheel driving mode to the low-gear all-wheel driving mode.

In the control apparatus according to the sixth aspect of the invention, the switching of the engine from the operated state to the stopped state is inhibited in the high-gear all-wheel driving mode and in the low-gear all-wheel driving mode. Therefore, a responsiveness of the drive power can be easily obtained in the all-wheel driving mode. Further, it is possible to prevent a so-called "busy feel" that could be caused if the engine is switched to the operated state immediately after being switched to the stopped state.

In the control apparatus according to the seventh aspect of the invention, when the low-gear all-wheel driving mode is selected in the high-gear main-drive-wheel driving mode with the engine being in the stopped state, the switching from the high-gear main-drive-wheel driving mode to the low-gear all-wheel driving mode is not executed, and the switching from the high-gear main-drive-wheel driving mode to the high-gear all-wheel driving mode is executed with the engine being kept in the stopped state. Therefore, it is possible to avoid the switching of the transmission from the high gear position to the low gear position and the switching from the main-drive-wheel driving mode to the all-wheel driving mode from being executed concurrently with each other, and accordingly to prevent generation of the shock.

In the control apparatus according to the eighth aspect of the invention, when the low-gear all-wheel driving mode is selected in the high-gear main-drive-wheel driving mode, it is notified to the driver of the vehicle that the switching to the high-gear all-wheel driving mode has been executed, and it is suggested to the driver of the vehicle to switch from the selection of the low-gear all-wheel driving mode to the selection of the high-gear all-wheel driving mode. Thus, it is possible to suggest the driver of the vehicle to make a selection corresponding to the high-gear all-wheel driving mode that is actually established, and accordingly to suggest the driver of the vehicle to select the appropriate low-gear all-wheel driving mode.

DETAILED DESCRIPTION OF PREFERRED EMBODIMENTS

Hereinafter, preferred embodiments of the invention will be described in detail with reference to the accompanying drawings.

First Embodiment

Figure 1:
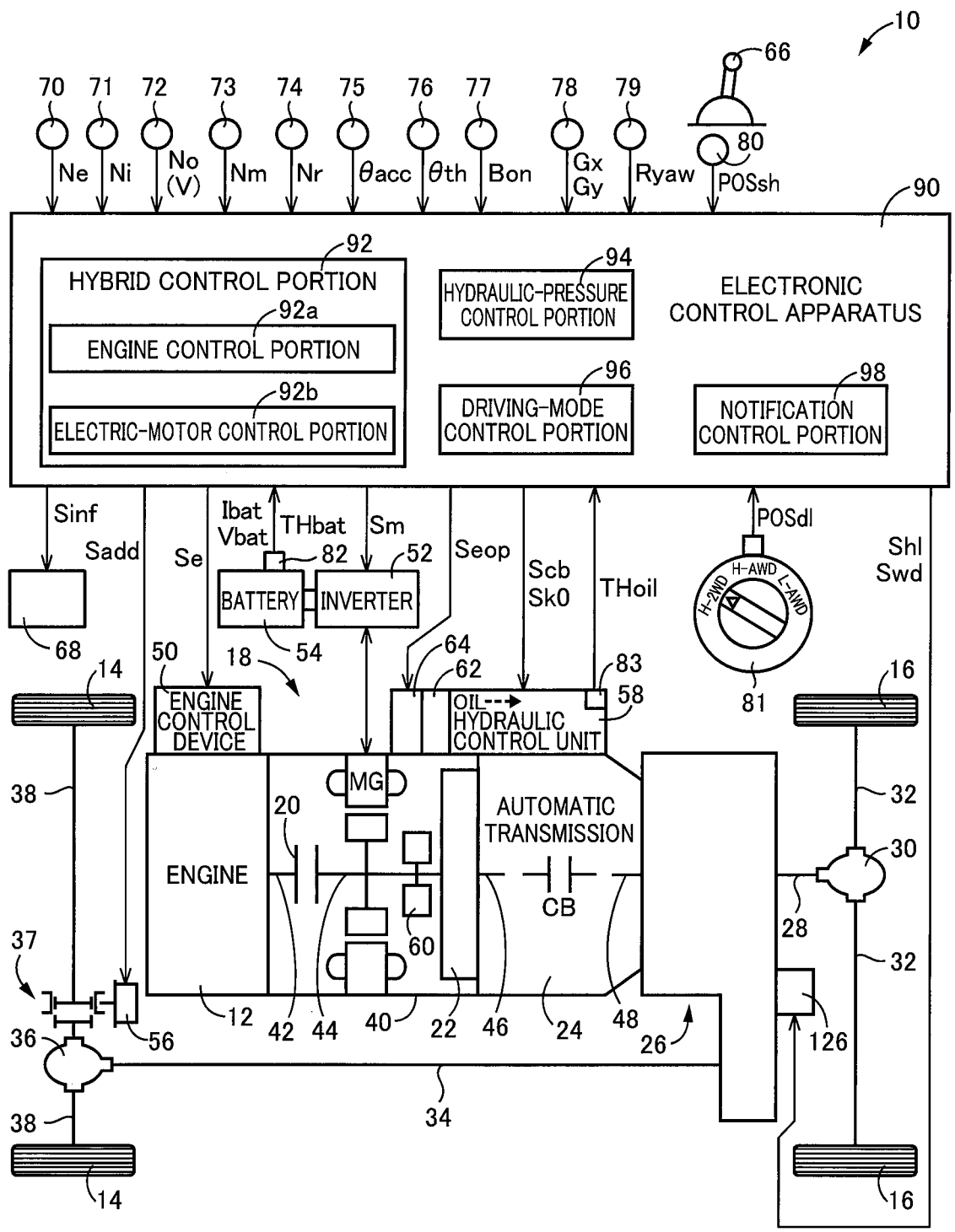
FIG. 1 is a view schematically showing a construction of a vehicle to which the present invention is applied, for explaining major portions of control functions and control systems that are provided to perform various control operations in the vehicle.

FIG. 1 is a view schematically showing a construction of a vehicle 10 to which the present invention is applied, for explaining major portions of control functions and control systems that are provided to perform various control operations in the vehicle 10. As shown in FIG. 1, the vehicle 10 is a hybrid electric vehicle including drive power sources in the form of an engine 12 and an electric motor MG. The vehicle 10 further includes right and left front wheels 14, right and left rear wheels 16 and a power transmission apparatus 18 that serves as a vehicle power transmission apparatus configured to transmit a drive power from the engine 12, for example, to the front wheels 14 and the rear wheels 16.

The vehicle 10 is an all-wheel drive vehicle based on a main-drive-wheel drive vehicle of FR (front engine and rear drive) system. The vehicle 10 is also a four-wheel drive vehicle based on a two-wheel drive vehicle of FR (front engine and rear drive) system, since the vehicle 10 has four wheels consisting of the two front wheels 14 and the two rear wheels 16. In the description of the present embodiment, a main-drive-wheel drive is synonymous with a two-wheel drive (=2WD), and an all-wheel drive (=AWD) is synonymous with a four-wheel drive (=4WD). The rear wheels 16 are main drive wheels serving as drive wheels during both of a 2WD running and an AWD running of the vehicle 10. The front wheels 14 are auxiliary drive wheels serving as driven wheels during the 2WD running and serving as the drive wheel during the AWD running. The 2WD running is a running in a 2WD state in which the drive power is transmitted to the rear wheels 16. The AWD running is a running in an AWD state in which the drive power is transmitted to the rear wheels 16 and the front wheels 14.

The engine 12 is a known internal combustion engine such as gasoline engine and diesel engine. The vehicle 10 is provided with an engine control device 50 that includes a throttle actuator, a fuel injection device and an ignition device. With the engine control device 50 being controlled by an electronic control apparatus 90 that is described below, an engine torque Te, which is an output torque of the engine 12, is controlled.

The electric motor MG is a rotating electric machine having a function serving as a motor configured to generate a mechanical power from an electric power and a function serving as a generator configured to generate an electric power from a mechanical power. That is, the electric motor MG is a so-called "motor generator". The electric motor MG is connected to a battery 54 provided in the vehicle 10, through an inverter 52 provided in the vehicle 10. The battery 54 is an electric storage device configured to supply and receive an electric power to and from the electric motor MG. The inverter 52 is controlled by the electronic control apparatus 90 whereby an MG torque Tm as an output torque of the electric motor MG is controlled. The MG torque Tm serves as a power running torque when acting as a positive torque for acceleration, with the electric motor MG being rotated in a forward direction that is the same as a direction of rotation of the engine 12 during operation of the engine 12. The MG torque Tm serves as a regenerative torque when acting as a negative torque for deceleration, with the electric motor MG being rotated in the forward direction. The electric power corresponds to an electric energy unless they are to be distinguished from each other. The power corresponds to a torque and a force unless they are to be distinguished from one another.

The power transmission apparatus 18 includes a casing 40 as a non-rotary member that is attached to a body of the vehicle 10, a K0 clutch 20, a torque converter 22, an automatic transmission 24, a transfer 26, a rear propeller shaft 28, a rear differential device 30, right and left rear drive shafts 32, a front propeller shaft 34, a front differential device 36 and right and left front drive shafts 38, such that the K0 clutch 20, torque converter 22 and automatic transmission 24 are disposed inside the casing 40. The power transmission apparatus 18 further includes an engine connection shaft 42 and an electric-motor connection shaft 44 that disposed inside the casing 40. The engine connection shaft 42 connects between the engine 12 and the K0 clutch 20. The electric-motor connection shaft 44 connects between the K0 clutch 20 and the torque converter 22.

The K0 clutch 20 is a clutch disposed in a power transmission path between the engine 12 and the torque converter 22, so that the torque converter 22 is to be connected to the engine 12 through the K0 clutch 20. The automatic transmission 24 is disposed in a power transmission path between the torque converter 22 and the transfer 26, so that the torque converter 22 is connected to a transmission input shaft 46 that is an input rotary member of the automatic transmission 24, and the transfer 26 is connected to a transmission output shaft 48 that is an output rotary member of the automatic transmission 24.

In the casing 40, the electric motor MG is connected to the electric-motor connection shaft 44 in a power transmittable manner. That is, the electric motor MG is connected to a power transmission path between the K0 clutch 20 and the torque converter 22, in a power transmittable manner. From a different point of view, the electric motor MG is connected to the torque converter 22 and the automatic transmission 24 in a power transmittable manner, without through the K0 clutch 20.

The torque converter 22 is a fluid-type transmission device configured to transmit the drive power of the drive power sources in the form of the engine 12 and the electric motor MG, to the transmission input shaft 46, through fluid circulating in the torque converter 22. The automatic transmission 24 is a mechanical-type transmission device configured to transmit the drive power of the drive power sources in the form of the engine 12 and the electric motor MG, to the transfer 26.

The front differential device 36 is a differential device provided with an ADD (Automatic Disconnecting Differential) mechanism 37 that is constituted by, for example, a dog clutch serving as a connection/disconnection clutch. The front differential device 36 is placed in its locked state, with an operation state, i.e., a controlled state of the ADD mechanism 37 being placed in its engaged state. The front differential device 36 is placed in its free state, with the controlled state of the ADD mechanism 37 being placed in its released state. The controlled state of the ADD mechanism 37 is switched, with an ADD-mechanism actuator 56 (provided in the vehicle 10) being controlled by the electronic control apparatus 90.

The automatic transmission 24 is a known automatic transmission of a planetary gear type which includes at least one planetary gear device (not shown) and a plurality of engagement devices CB. Each of the engagement devices CB is a known hydraulically-operated frictional engagement device, for example. Each of the engagement devices CB receives a regulated CB hydraulic pressure PRcb supplied from a hydraulic control unit (hydraulic control circuit) 58 that is provided in the vehicle 10, whereby a CB torque Tcb, i.e., torque capacity is changed and its controlled state is switched between an engaged state and a released state, for example. The hydraulic control unit 58 is to be controlled by the electronic control apparatus 90.

The automatic transmission 24 is a step-variable automatic transmission configured to establish a selected one of a plurality of gear positions, with a corresponding one or ones of the engagement devices CB being engaged, wherein the gear positions are different from each other in gear ratio (speed ratios) γat (=AT input rotational speed Ni/AT output rotational speed No). The automatic transmission 24 is configured to switch from one of the AT gear positions to another one of the AT gear positions, namely, to establish one of the AT gear positions which is selected, by the electronic control apparatus 90, depending on, for example, an accelerating operation made by a vehicle driver (operator) and the vehicle running speed V. The AT input rotational speed Ni is a rotational speed of the transmission input shaft 46, and is an input rotational speed of the automatic transmission 24. The AT output rotational speed No is a rotational speed of the transmission output shaft 48, and is an output rotational speed of the automatic transmission 24.

The K0 clutch 20 is a hydraulically-operated frictional engagement device in the form of a multiple-disc type or a single-disc type clutch that is to be pressed by a hydraulic actuator, for example. The K0 clutch 20 receives a regulated K0 hydraulic pressure PRk0 supplied from the hydraulic control unit 58, whereby a K0 clutch torque Tk0, i.e., torque capacity of the K0 clutch 20 is changed and its operation state is switched between the engaged state and the released state, for example.

The transfer 26 is configured to selectively connect and cut-off a power transmission, for example, between the rear propeller shaft 28 and the front propeller shaft 34, so as to transmit the drive power transmitted from the automatic transmission 24, to only the rear wheels 16 or to the front and rear wheels 14, 16. Thus, the transfer 26 distributes the drive power to the rear wheels 16 as the main drive wheels and the front wheels 14 as the auxiliary drive wheels, with a ratio of distribution of the drive power between the main drive wheels and the auxiliary drive wheels being changeable.

Figure 2:
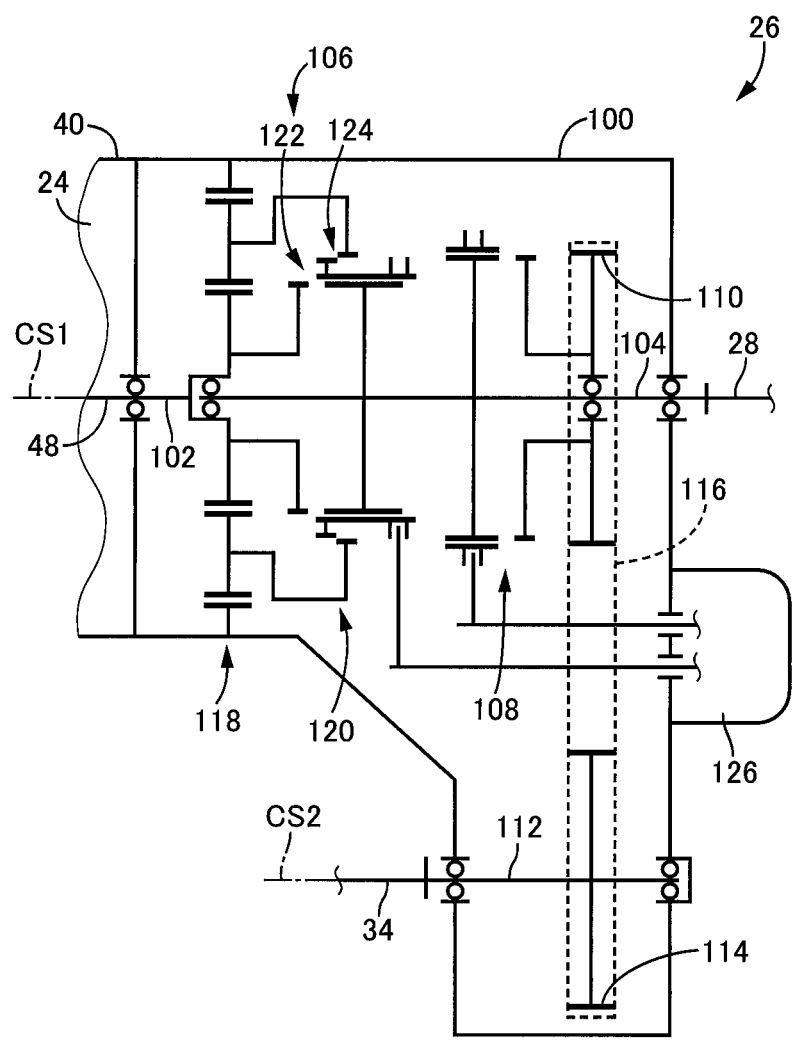
FIG. 2 is a view schematically showing a construction of a transfer shown in FIG. 1.

FIG. 2 is a view schematically showing a construction of the transfer 26, wherein the view is a development view illustrating the transfer 26 in a manner in which axes of an input shaft 102 and first and second output shafts 104, 112 are contained in a single plane. As shown in FIG. 2, the transfer 26 includes a non-rotary member in the form of a transfer casing 100 that is connected to one of opposite end portions of the casing 40, wherein the one of the opposite end portions is located on a rear side of the other of the opposite end portions in a direction of running of the vehicle 10. The transfer 26 further includes the input shaft 102, the first output shaft 104, an auxiliary transmission 106, a power-distribution dog clutch 108 and a drive gear 110 which are provided inside the transfer casing 100 and which are disposed on a common axis in the form of a first axis CS1. The transfer 26 further includes the second output shaft 112 and a driven gear 114 which are provided inside the transfer casing 100 and which are disposed on another common axis in the form of a second axis CS2. The transfer 26 further includes a chain 116 connecting between the drive gear 110 and the driven gear 114.

The input shaft 102 is connected to the transmission output shaft 48. The first output shaft 104 is connected to the rear propeller shaft 28. The second output shaft 112 is connected to the front propeller shaft 34. The drive gear 110 is selectively allowed to be rotated relative to the first output shaft 104, and inhibited from being rotated relative to the first output shaft 104. The driven gear 114 is unrotatable relative to the second output shaft 112.

The auxiliary transmission 106 includes a planetary gear device 118 and an auxiliary-transmission dog clutch 120 that includes a high-gear-side dog mechanism 122 and a low-gear-side dog mechanism 124. The high-gear-side dog mechanism 122 is provided to establish a high gear position GSH providing a low gear ratio and making the vehicle 10 run at a high running speed. The low-gear-side dog mechanism 124 is provided to establish a low gear position GSL providing a high gear ratio and making the vehicle 10 run at a low running speed. Each of the high-gear-side dog mechanism 122 and the low-gear-side dog mechanism 124 is constituted by a dog clutch provided with a synchronous meshing mechanism, for example. That is, the auxiliary transmission 106 is a transmission configured to establish a selected one of the low gear position GSL and the high gear position GSH, which is selected depending on an operation of the auxiliary-transmission dog clutch 120 as a dog clutch.

The transfer 26 is configured to transmit rotation of the input shaft 102 to the first output shaft 104 through the auxiliary transmission 106.

The power-distribution dog clutch 108 is an engagement device configured to selectively allow the drive gear 110 to be rotated relative to the first output shaft 104 and inhibit the drive gear 110 from being rotated relative to the first output shaft 104. The power-distribution dog clutch 108 is a dog clutch provided with a synchronous meshing mechanism, for example. With the power-distribution dog clutch 108 being placed in its released state, the drive gear 110 is rotatable about the first axis CS1 relative to the first output shaft 104, whereby the power transmission between the first and second output shafts 104, 112 through the drive gear 110, chain 116 and driven gear 114, for example, is disabled. With the power-distribution dog clutch 108 being placed in its engaged state, the drive gear 110 is inhibited from being rotated about the first axis CS1 relative to the first output shaft 104, whereby the power transmission between the first and second output shafts 104, 112 through the drive gear 110, chain 116 and driven gear 114, for example, is enabled.

The transfer 26 further includes a shift actuator 126 fixed to the transfer casing 100. The shift actuator 126 is an actuator configured to operate the auxiliary-transmission dog clutch 120 and the power-distribution dog clutch 108.

Referring back to FIG. 1, when the power-distribution dog clutch 108 is placed in the engaged state in the transfer 26 and the ADD mechanism 37 is placed in the engaged state in the front differential device 36, a part of the drive power is transmitted to the second output shaft 112 through the transfer 26, and is transmitted to the front differential device 36 through the front propeller shaft 34, so that the part of the drive power is transmitted eventually to the front wheels 14 through the front drive shafts 38. Meanwhile, the remainder of the drive power, which is not transmitted to the second output shaft 112 through the transfer 26, is transmitted to the rear differential device 30 through the rear propeller shaft 28, and is transmitted eventually to the rear wheels 16 through the rear drive shafts 32. Thus, the vehicle 10 is placed in the AWD state.

On the other hand, when the power-distribution dog clutch 108 is placed in the released state in the transfer 26, the drive power is transmitted through the transfer 26 only to the rear wheels 16, so that the vehicle 10 is placed in the 2WD state. In the vehicle 10, the ADD mechanism 37 is placed in the released state, for example, when the vehicle 10 is placed in the 2WD state.

In the vehicle 10, when the K0 clutch 20 is placed in the engaged state, the engine 12 and the torque converter 22 are connected to each other in a power transmittable manner. On the other hand, when the K0 clutch 20 is placed in the released state, the power transmission between the engine 12 and the torque converter 22 is cut off. Since the electric motor MG is connected to the torque converter 22, the K0 clutch 20 serves as a clutch configured to selectively connect and disconnect the engine 12 to and from the electric motor MG.

In the power transmission apparatus 18, when the K0 clutch 20 is in the engaged state, the drive power outputted by the engine 12 is transmitted from the engine connection shaft 42 to the transfer 26 through sequentially the K0 clutch 20, electric-motor connection shaft 44, torque converter 22 and automatic transmission 24, for example. Meanwhile, the drive power outputted by the electric motor MG is transmitted from the electric-motor connection shaft 44 to the transfer 26 sequentially the torque converter 22 and automatic transmission 24, for example, irrespective of the controlled state of the K0 clutch 20. The drive power, which has been transmitted to the transfer 26, is further transmitted from the transfer 26 to the rear wheels 16 when the vehicle 10 is in the 2WD state, and is further transmitted from the transfer 26 to the front wheels 14 as well as to the rear wheels 16 when the vehicle 10 is in the AWD state.

The vehicle 10 further includes an MOP 60 that is a mechanically-operated oil pump, an EOP 62 that is an electrically-operated oil pump, and a pump motor 64. The MOP 60 is connected to the electric-motor connection shaft 44, and is to be rotated and driven by the drive power source or sources (i.e., engine 12 and/or electric motor MG), so as to output a working fluid OIL that is to be used in the power transmission apparatus 18. The pump motor 64 is a motor serving exclusively to rotate and drive the EOP 62. The EOP 62 outputs the working fluid OIL, when being rotated and driven by the pump motor 64. The working fluid OIL outputted by the MOP 60 and the EOP 62 is supplied to the hydraulic control unit 58. The hydraulic control unit 58, which receives the working fluid OIL as an original hydraulic pressure, supplies regulated hydraulic pressures that serve as the CB hydraulic pressure PRcb and the K0 hydraulic pressure PRk0, for example.

The vehicle 10 is further provided with the electronic control apparatus 90 which is constructed according to the present invention and which is related to control of the engine 12, for example. The electronic control apparatus 90 includes a so-called microcomputer incorporating a CPU, a ROM, a RAM and an input-output interface. The CPU performs various control operations of the vehicle 10, by processing various input signals, according to control programs stored in the ROM, while utilizing a temporary data storage function of the RAM. The electronic control apparatus 90 may be constituted by two or more control units exclusively assigned to perform respective different control operations such as an engine control operation, an electric-motor control operation and a hydraulic-pressure control operation, as needed.

The electronic control apparatus 90 receives various input signals based on values detected by respective sensors provided in the vehicle 10. Specifically, the electronic control apparatus 90 receives: an output signal of an engine speed sensor 70 indicative of an engine rotational speed Ne that is a rotational speed of the engine 12; an output signal of an input speed sensor 71 indicative of the AT input rotational speed Ni; an output signal of an output speed sensor 72 indicative of the AT output rotational speed No corresponding to the vehicle running speed V; an output signal of an MG speed sensor 73 indicative of an MG rotational speed Nm that is a rotational speed of the electric motor MG; an output signal of a wheel speed sensor 74 indicative of a wheel speed Nr that is a rational speed of each of the front and rear wheels 14, 16; an output signal of an accelerator-opening degree sensor 75 indicative of an accelerator opening degree (accelerator operation degree) θacc representing an amount of accelerating operation made by the vehicle driver; an output signal of a throttle-opening degree sensor 76 indicative of a throttle opening degree θth which is an opening degree of an electronic throttle valve; an output signal of a brake pedal sensor 77 indicative of the braking operation amount Bra and also a brake ON signal representing a state in which the brake pedal is being operated by the vehicle driver so as to operate the wheel brakes; an output signal of a G sensor 78 indicative of a longitudinal acceleration Gx and a lateral acceleration Gy of the vehicle 10; an output signal of a yaw rate sensor 79 indicative of a yaw rate Ryaw that is an angular acceleration of the vehicle 10 about its vertical axis; an output signal of a shift position sensor 80 indicative of a shift operation position POSsh that is an operation position of a shift lever 66 provided in the vehicle 10; an output signal of a driving-state selection dial switch 81 indicative of a dial-switch operation position POSdl that is an operation position of driving-state selection dial switch 81; an output signal of a battery sensor 82 indicative of a battery temperature THbat, a battery charging/discharging electric current Ibat and a battery voltage Vbat of the battery 54; and an output signal of a fluid temperature sensor 83 indicative of a working-fluid temperature THoil that is a temperature of the working fluid OIL.

The shift lever 66 is a shift operation member for permitting the vehicle driver to manually select one of a plurality of shift positions in the power transmission apparatus 18, particularly, in the automatic transmission 24. The shift lever 66 is to be operated, by the vehicle driver, to be placed in the shift operation position POSsh corresponding to the selected one of the shift positions in the power transmission apparatus 18 or in the automatic transmission 24 (hereinafter simply referred to as "the shift positions in the automatic transmission 24"). The shift lever 66 is to be placed in one of a plurality of operation positions as the shift operation position POSsh, wherein the plurality of operation positions include P, R, N and D operation positions, for example.

The P operation position is for selecting a parking position (=P position) as one of the shift positions in the automatic transmission 24. When the P position is established in the automatic transmission 24, the automatic transmission 24 is placed in its neutral state and rotation of the transmission output shaft 48 is mechanically inhibited. The neutral state of the automatic transmission 24 is a state in which the drive power is not transmittable through the automatic transmission 24, and is realized by cutting off the power transmission through the automatic transmission 24, for example, with any one of the engagement devices CB being placed in the released state. The mechanical inhibition of rotation of the transmission output shaft 48 is made by a known parking lock mechanism provided in the vehicle 10. That is, the automatic transmission 24 is placed in its parking lock state, when the P position is established in the automatic transmission 24. The R operation position is a reverse-driving operation position for selecting a reverse driving position (=R position) as one of the shift positions in the automatic transmission 24. When the R position is established in the automatic transmission 24, the vehicle 10 is enabled to run in reverse direction. The N operation position is a neutral operation position for selecting a neutral position (=N position) as one of the shift positions in the automatic transmission 24. When the N position is established in the automatic transmission 24, the automatic transmission 24 is placed in the neutral state, so that the transmission output shaft 48 is not mechanically unrotatably fixed whereby the power transmission through the automatic transmission 24 is disabled. The D operation position is a forward-driving operation position for selecting a forward driving position (=D position) as one of the shift positions in the automatic transmission 24. When the D position is established in the automatic transmission 24, the vehicle 10 is enabled to run in forward direction with an automatic shift control being executed for the automatic transmission 24. That is, when the D position is established in the automatic transmission 24, the drive power causing the vehicle 10 to run in the forward direction can be transmitted through the automatic transmission 24. When either the P position or the N position is established in the automatic transmission 24, the automatic transmission 24 is placed in its non-driving position that disables transmission of the drive power. When either the R position or the D position is established in the automatic transmission 24, the he automatic transmission 24 is placed in its driving position that enables transmission of the drive power.

The driving-state selection dial switch 81 is disposed in the vicinity of the driver's seat, for example, and is a dial switch that is to be operated by the vehicle driver for selecting a driving state of the vehicle 10. The driving-state selection dial switch 81 is to be placed in one of three operation positions consisting of "H-2WD", "H-AWD" and "L-AWD", for example. When the driving-state selection dial switch 81 is placed in "H-2WD", a high-gear 2WD mode is selected as one of the driving modes. When the driving-state selection dial switch 81 is placed in "H-AWD", a high-gear AWD mode is selected as one of the driving modes. When the driving-state selection dial switch 81 is placed in "L-AWD", a low-gear AWD mode is selected as one of the driving modes. The high-gear 2WD mode is a driving mode in which the vehicle 10 is placed in the 2WD state as the driving state with the auxiliary transmission 106 of the transfer 26 being placed in the high gear position GSH. In the 2WD mode in which the drive power is distributed only to the rear wheels 16, the auxiliary transmission 106 is basically placed in the high gear position GSH. That is, in the present embodiment, the 2WD mode is the high-gear 2WD mode. The high-gear AWD mode is a driving mode in which the vehicle 10 is placed in the AWD state as the driving state with the auxiliary transmission 106 being placed in the high gear position GSH. The low-gear AWD mode is a driving mode in which the vehicle 10 is placed in the AWD state as the driving state with the auxiliary transmission 106 being placed in the low gear position GSL. In the present embodiment, an AWD mode (in which the drive power is distributed to the front wheels 14 as well as to the rear wheels 16) is categorized into the low-gear AWD mode and the high-gear AWD mode. It is noted that the driving-state selection dial switch 81 does not necessarily have to be the dial switch but may be a slide button or a seasaw button, for example.

The electronic control apparatus 90 generates various output signals to the various devices provided in the vehicle 10, such as: an engine control command signal Se that is to be supplied to the engine control device 50 for controlling the engine 12, an MG control command signal Sm that is to be supplied to the inverter 52 for controlling the electric motor MG; an ADD-switch control command signal Sadd that is to be supplied to the ADD-mechanism actuator 56 for switching a controlled state of the ADD mechanism 37; a CB hydraulic command signal Scb that is to be supplied to the hydraulic control unit 58 for controlling the engagement devices CB; a K0 hydraulic command signal Sk0 that is to be supplied to the hydraulic control unit 58 for controlling the K0 clutch 20; an EOP control command signal Seop that is to be supplied to the pump motor 64 for controlling operation of the EOP 62; an information-notification control command signal Sinf that is to be supplied to an information notification device 68 for notifying the vehicle driver of various information; a high/low switching control signal Shl that is to be supplied to the shift actuator 126 for switching the auxiliary transmission 106 between the high gear position GSH and the low gear position GSL; and a driving-state switching control signal Swd that is to be supplied to the shift actuator 126 for controlling the transfer 26 so as to switch the vehicle 10 between the 2WD state and the AWD state.

The information notification device 68 is configured to notify the vehicle driver of various information, for example, when an operation requesting a non-allowable control (i.e., control that is not allowed in the vehicle 10) to be executed is made or when a function related to running of the vehicle 10 is reduced. The information notification device 68 may be constituted by, for example, an indication device such as a monitor, a display and an alarm lamp and/or a sound output device such as a speaker and a buzzer.

For performing various control operations in the vehicle 10, the electronic control apparatus 90 includes a hybrid control means in the form of a hybrid control portion 92, a hydraulic-pressure control means in the form of a hydraulic-pressure control portion 94, a driving mode control means in the form of a driving-mode control portion 96, and a notification control means in the form of a notification control portion 98.

The hybrid control portion 92 has a function serving as an engine control means in the form of an engine control portion 92a for controlling operation of the engine 12 and a function serving as an electric-motor control means in the form of an electric-motor control portion 92b for controlling operation of the electric motor MG through the inverter 52, and executes a hybrid-drive control operation, for example, using the engine 12 and the electric motor MG through these control functions.

The hybrid control portion 92 calculates a requested drive amount of the vehicle 10 requested by the vehicle driver, by applying the accelerator opening degree θacc and the vehicle running speed V, for examples, to a requested drive amount map that represents a pre-stored relationship obtained by experimentation or determined by an appropriate design theory. The requested drive amount is, for example, a requested drive torque Trdem of the drive wheels (rear wheels 16 and front wheels 14). From another point of view, the requested drive torque Trdem [Nm] is a requested drive power Prdem [W] at the current vehicle running speed V. As the requested drive amount, another value such as a requested drive force Frdem [N] of the drive wheels 14 and a requested AT output torque of the transmission output shaft 48 may be used, too. In the calculation of the requested drive amount, it is also possible to use, for example, the AT output rotational speed No in place of the vehicle running speed V.

The hybrid control portion 92 outputs the engine control command signal Se and the MG control command signal Sm for controlling the engine 12 and the electric motor MG, respectively, such that the requested drive power Prdem is realized, by taking account of various factors such as a transmission loss, an auxiliary load, the gear ratio γat of the automatic transmission 24 and a maximum chargeable amount Win and a maximum dischargeable amount Wout of the battery 54. The engine control command signal Se is, for example, a command value of an engine power Pe that is the power of the engine 12 outputting the engine torque Te at the current engine rotational speed Ne. The MG control command signal Sm is, for example, a command value of a consumed electric power Wm of the electric motor MG outputting the MG torque Tm at the current motor rotational speed Nm.

The maximum chargeable amount Win of the battery 54 is a maximum amount of the electric power that can be charged to the battery 54, and represents a limitation of the electric power inputted to the battery 54, namely, a limitation of input to the battery 54. The maximum dischargeable amount Wout of the battery 54 is a maximum amount of the electric power that can be discharged from the battery 54, and represents a limitation of the electric power outputted from the battery 54, namely, a limitation of output of the battery 54. The maximum chargeable and dischargeable amounts Win, Wout are calculated by the electronic control apparatus 90, for example, based on the battery temperature THbat and a state-of-charge value SOC [%] of the battery 54. The state-of-charge value SOC of the battery 54 is a value indicative of a charged state of the battery 54, i.e., an amount of the electric power stored in the battery 54, and is calculated by the electronic control apparatus 90, for example, based on the charging/discharging electric current Ibat and the voltage Vbat of the battery 54.

When the requested drive torque Trdem can be covered by only the output of the electric motor MG, the hybrid control portion 92 establishes a motor driving (=EV driving) mode as one of the driving modes. When the EV driving mode is established, the hybrid control portion 92 causes the vehicle 10 to perform an EV driving with the K0 clutch 20 being released and with only the electric motor MG serving as the drive power source. On the other hand, when the requested drive torque Trdem cannot be covered without at least the output of the engine 12, the hybrid control portion 92 establishes an engine driving mode, i.e., a hybrid driving (=HV driving) mode. When the HV driving mode is established, the hybrid control portion 92 causes the vehicle 10 to perform an engine driving, i.e., an HV driving with the K0 clutch 20 being engaged and with at least the engine 12 serving as the drive power source. Further, even when the requested drive torque Trdem can be covered by only the output of the electric motor MG the hybrid control portion 92 establishes the HV driving mode, for example, in a case in which the state-of-charge value SOC of the battery 54 becomes less than a predetermined engine-start threshold value SOCengf or in a case in which the engine 12 or other component needs to be warmed up. The engine-start threshold value is a predetermined threshold value for determining that the state-of-charge value SOC reaches a level at which the engine 12 must forcibly be started for charging the battery 54. Thus, the hybrid control portion 92 switches between the EV driving mode and the HV driving mode, based on, for example, the requested drive torque Trdem, by automatically stopping the engine 12 during the HV driving, restarting the engine 12 after the stop of the engine 12, and starting the engine 12 during the EV driving.

The engine control portion 92a is configured to determine whether the starting of the engine 12 is requested (required) or not. The engine control portion 92a determines whether the starting of the engine 12 is requested or not, for example, depending on (i) whether the requested drive torque Trdem has become larger than a range that can be covered by only the output of the electric motor MG, (ii) whether the engine 12 or other component needs to be warmed up and (iii) whether the state-of-charge value SOC of the battery 57 has become less than the engine-start threshold value SOCengf.

When it is determined by the engine control portion 92a that the starting of the engine 12 is requested, the hydraulic-pressure control portion 94 outputs the K0 hydraulic command signal Sk0 that is supplied to the hydraulic control unit 58, wherein the hydraulic command signal Sk0 requests the K0 clutch 20 to be switched from the released state to the engaged state, for thereby obtaining the K0 torque Tk0 that enables transmission of a torque required for cranking of the engine 12, i.e., a torque by which the engine rotational speed Ne to be increased. In the following description of the present embodiment, the torque required for cranking of the engine 12 will be referred to as "required cranking torque Tcrn".

When it is determined by the engine control portion 92a that the starting of the engine 12 is requested, the electric-motor control portion 92b outputs the MG control command signal Sm that is supplied to the inverter 52, wherein the MG control command signal Sm requests the electric motor MG to output the required cranking torque Tcrn concurrently with switching of the K0 clutch 20 from the released state to the engaged state by the hydraulic-pressure control portion 94.

When determining that the starting of the engine 12 is requested, the engine control portion 92a outputs the engine control command signal Se that is supplied to the engine control device 50, wherein the engine control command signal Se requests fuel supply and engine ignition to be initiated in conjunction with the cranking of the engine 12 that is made by the K0 clutch 20 and the electric motor MG.

When the engine 12 is to be started during the EV driving, the electric-motor control portion 92b causes the electric motor MG to output the MG torque Tm corresponding to the required cranking torque Tcrn, in addition to the MG torque Tm for the EV driving, i.e., the MG torque Tm serving as the drive torque Tr. To this end, during the EV driving, the required cranking torque Tcrn needs to be available or assured in preparation for starting the engine 12. Therefore, when the engine 12 is to be started, the requested drive torque Trdem can be covered by only the output of the electric motor MG, when the requested drive torque Trdem is not larger than a torque value obtained by subtracting the required cranking torque Tcrn from an outputtable maximum torque of the electric motor MG. The outputtable maximum torque of the electric motor MG is an outputtable maximum value of the motor torque Tm which is dependent on the maximum dischargeable amount Wout of the battery 54.

The engine control portion 92a makes a determination as to whether the stop of the engine 12 is requested or not. This determination is made by the engine control portion 92a during the HV driving mode, depending on, for example, (i) whether the requested drive torque Trdem can be covered by only the output of the electric motor MG, (ii) whether the engine 12 or other components are unrequired to be warmed, and (iii) whether the state-of-charge value SOC of the battery 54 is at least the engine-start threshold value SOCengf.

When determining that the stop of the engine 12 is requested, the engine control portion 92a supplies, to the engine control device 50, the engine control command signal Se requesting stop of the fuel supply to the engine 12. That is, when the engine 12 is to be stopped, the engine control portion 92a supplies, to the engine control device 50, the engine control command signal Se by which the engine 12 is to be controlled to be stopped.

When it is determined by the engine control portion 92a that the stop of the engine 12 is requested, the hydraulic-pressure control portion 94 supplies, to the hydraulic control unit 58, the K0 hydraulic command signal Sk0 by which the K0 clutch 20 is to be controlled to be switched from the engaged state to the released state.

Thus, the engine control portion 92a controls the operation state of the engine 12, so as to start and stop the engine 12, depending on the currently established driving mode and the current state of the vehicle 10.

The hydraulic-pressure control portion 94 determines whether a shifting action is to be executed in the automatic transmission 24, by using, for example, a shifting map that represents a predetermined relationship, and outputs the CB hydraulic command signal Scb, as needed, which is supplied to the hydraulic control unit 58, for executing the shifting action in the automatic transmission 24. In the shifting map, the predetermined relationship is represented by shifting lines in two-dimensional coordinates in which the vehicle running speed V and the requested drive torque Trdem as two variables are taken along respective two axes, wherein the shifting lines are used for the determination as to whether the shifting action is to be executed in the automatic transmission 24. In the shifting map, one of the two variables may be the AT output rotational speed No in place of the vehicle running speed V, and the other of the two variables may be any one of the requested drive force Frdem, accelerator opening degree θacc and throttle opening degree θth in place of the requested drive torque Trdem.

The driving-mode control portion 96 controls running of the vehicle 10 so as to realize selected at least one of the driving modes which is selected by the vehicle driver. Specifically, the driving modes include the high-gear 2WD mode, the high-gear AWD mode and the low-gear AWD mode.

When the high-gear 2WD mode is selected by the driving-state selection dial switch 81, the driving-mode control portion 96 outputs the high/low switching control signal Shl and the driving-state switching control signal Swd that are supplied to the shift actuator 126, and also outputs the ADD-switch control command signal Sadd that is supplied to the ADD-mechanism actuator 56, wherein the high/low switching control signal Shl requests the high gear position GSH to be established in the auxiliary transmission 106, the driving-state switching control signal Swd requests the power-distribution dog clutch 108 to be placed in the released state, and the ADD-switch control command signal Sadd requests the ADD mechanism 37 to be placed in the released state.

When the high-gear AWD mode is selected by the driving-state selection dial switch 81, the driving-mode control portion 96 outputs the high/low switching control signal Shl and the driving-state switching control signal Swd that are supplied to the shift actuator 126, and also outputs the ADD-switch control command signal Sadd that is supplied to the ADD-mechanism actuator 56, wherein the high/low switching control signal Shl requests the high gear position GSH to be established in the auxiliary transmission 106, the driving-state switching control signal Swd requests the power-distribution dog clutch 108 to be placed in the engaged state, and the ADD-switch control command signal Sadd requests the ADD mechanism 37 to be placed in the engaged state.

When the low-gear AWD mode is selected by the driving-state selection dial switch 81, the driving-mode control portion 96 outputs the high/low switching control signal Shl and the driving-state switching control signal Swd that are supplied to the shift actuator 126, and also outputs the ADD-switch control command signal Sadd that is supplied to the ADD-mechanism actuator 56, wherein the high/low switching control signal Shl requests the low gear position GSL to be established in the auxiliary transmission 106, the driving-state switching control signal Swd requests the power-distribution dog clutch 108 to be placed in the engaged state, and the ADD-switch control command signal Sadd requests the ADD mechanism 37 to be placed in the engaged state.

For switching between the low-gear AWD mode and the high-gear AWD mode, the auxiliary-transmission dog clutch 120 of the auxiliary transmission 106 requires to be switched. For switching the auxiliary-transmission dog clutch 120, the input shaft 102 and other rotary members are required to be rotated to some extent. For switching between the low-gear AWD mode and the high-gear AWD mode, the engine 12 is required to be in its operated state, or alternatively, the electric motor MG is required to be rotated. In the AWD mode, the electric motor MG is placed in its rotated state when the engine 12 is in its stopped state.

When the engine 12 is in the stopped state either in the low-gear AWD mode or in the high-gear AWD mode, for example, the electric-motor control portion 92b executes an MG idling control for idling the electric motor MG. The MG idling control is a control for placing the electric motor MG into an idle state in which the MG rotational speed Nm is kept at an MG idle speed that is a predetermined idling rotational speed of the electric motor MG. In the MG idling control, the electric motor MG is controlled to output a predetermined torque causing a creep phenomenon in which the vehicle 10 is moved slowly with the accelerator being kept OFF, upon release of the brake pedal during a temporary stop of the vehicle 10 when the engine 12 is in the stopped state with the accelerator being OFF. The predetermined torque is a creep toque that causes the vehicle 10 to perform a so-called creep running, for example, when the brake pedal is released with the accelerator being kept OFF during the stopped state of the vehicle 10.

The notification control portion 98 is configured, for example, when an operation requesting a non-allowable control (i.e., control that is not allowed in the vehicle 10) to be executed is made or when a function related to running of the vehicle 10 is reduced, to output the information-notification control command signal Sinf that is supplied to the information notification device 68, wherein the information-notification control command signal Sinf requests the information notification device 68 to notify that the executed operation is made invalid, suggest the vehicle driver to execute another operation, or notify the current situation of the vehicle 10.

In the low-gear AWD mode, a larger drive force Fr is likely to be required as compared with in the high-gear 2WD mode and in the high-gear AWD mode. In the HV driving mode in which the engine 12 is in its operated state, a larger drive force Fr is available easier than in the EV driving mode. Therefore, when the low-gear AWD mode is selected during the stopped state of the engine 12, it might be possible to start the engine 12 so as to place the engine 12 in the operated state.

By the way, when the vehicle driver selects the low-gear AWD mode, there is a possibility that the vehicle driver does not necessarily have an intention to start the engine 12. The possibility that the vehicle driver does not have the intention to start the engine 12 is higher, for example, when the automatic transmission 24 is in the non-driving position as compared with when the automatic transmission 24 is in the driving position. Further, if the engine 12 is started immediately when the low-gear AWD mode is selected, there is a possibility that switching to the low-gear AWD mode could be executed concurrently with starting of the engine 12, thereby causing a shock in the vehicle 10. It is desirable to make the vehicle driver hardly feel uncomfortable when the low-gear AWD mode is selected.

Therefore, in the present embodiment, in a case in which the low-gear AWD mode is selected in the high-gear 2WD mode or high-gear AWD mode with the engine 12 being in the stopped state, the engine control portion 92a does not start the engine 12 immediately when the low-gear AWD mode is selected. When the low-gear AWD mode is selected in the high-gear AWD mode, engine control portion 92a starts the engine 12, when switching from the high-gear AWD mode to the low-gear AWD mode has been completed, or when the vehicle driver executes an operation that makes the vehicle driver feel hardly uncomfortable even with the engine 12 being started.

That is, in a case in which the low-gear AWD mode is selected in the high-gear AWD mode when the engine 12 is in the stopped state with the automatic transmission 24 being in the non-driving position, the engine control portion 92a maintains the stopped state of the engine 12 until the completion of switching from the high-gear AWD mode to the low-gear AWD mode by the driving-mode control portion 96, and starts the engine 12 after the completion of the switching from the high-gear AWD mode to the low-gear AWD mode. Further, in the above-described case, the engine control portion 92a starts the engine 12, after a predetermined operation AMf by the vehicle driver to drive the vehicle 10 (namely, to cause the vehicle 10 to run), in addition to after the completion of the switching to the low-gear AWD mode.

The predetermined operation AMf is, for example, a switching operation for switching from a state for selecting the non-driving position of the automatic transmission 24, to a state for selecting the driving position of the automatic transmission 24. The state for selecting the non-driving position of the automatic transmission 24 is a state in which the shift operation position POSsh (that is the operation position of the shift lever 66) is the P operation position or N operation position. The state for selecting the driving position of the automatic transmission 24 is a state in which the shift operation position POSsh is the D operation position or R operation position. That is, the above-described switching operation is an operation for switching from the N operation position or P operation position, to the D operation or R operation position. In the following description, this operation (for switching from the N operation position or P operation position, to the D operation or R operation position) will be referred simply to as "N(P)→D(R) operation".

Alternatively, the predetermined operation AMf is, for example, the N(P)→D(R) operation and an acceleration requesting operation for increasing the drive force Fr after the N(P)→D(R) operation. The acceleration requesting operation for increasing the drive force Fr is, for example, an accelerating operation for increasing a requested drive force Frdem.

Specifically, the engine control portion 92a determines whether the engine 12 is in the stopped state or not. The hydraulic-pressure control portion 94 determines whether the automatic transmission 24 is in the non-driving position or not.

When it is determined by the engine control portion 92a that the engine 12 is in the stopped state and it is determined by the hydraulic-pressure control portion 94 that the automatic transmission 24 is in the non-driving position, the driving-mode control portion 96 determines whether the high-gear AWD mode as one of the driving modes is established or not. When determining that the high-gear AWD mode is established, the driving-mode control portion 96 determines whether the low-gear AWD mode is selected or not, based on the dial-switch operation position POSdl.

When determining that the low-gear AWD mode is selected, the driving-mode control portion 96 executes switching from the high-gear AWD mode to the low-gear AWD mode with the engine 12 being kept in the stopped state, by switching the auxiliary transmission 106 from the high gear position GSH to the low gear position GSL by operation of the auxiliary-transmission dog clutch 120 in a state in which a creep torque is outputted from the electric motor MG by the electric-motor control portion 92b.

When it is determined by the driving-mode control portion 96 that the switching from the high-gear AWD mode to the low-gear AWD mode has been completed, the hydraulic-pressure control portion 94 determines whether the N(P)→D(R) operation as the predetermined operation AMf has been executed or not.

When determining that the N(P)→D(R) operation has been executed, the hydraulic-pressure control portion 94 switches the automatic transmission 24 from the non-driving position to the driving position in response to the N(P)→D(R) operation. Then, the hydraulic-pressure control portion 94 determines whether the switching of the automatic transmission 24 from the non-driving position to the driving position has been completed or not.

The engine control portion 92a starts the engine 12 when it is determined by the hydraulic-pressure control portion 94 that the switching of the automatic transmission 24 from the non-driving position to the driving position has been completed. That is, the engine control portion 92a does not initiate starting of the engine 12 in process of the switching of the automatic transmission 24 from the non-driving position to the driving position in response to the N(P)→D(R) operation.

In the high-gear 2WD mode, an energy efficiency is prioritized as compared with in the AWD mode. Therefore, in the high-gear 2WD mode, it is desirable that the EV driving mode and the HV driving mode are alternately switched to each other by execution of an engine intermittent operation in which the engine 12 is placed alternately in the operated state and the stopped state. On the other hand, in the AWD mode, a responsiveness of the drive force Fr is prioritized as compared with in the high-gear 2WD mode. Therefore, in the AWD mode, once after the engine 12 is placed into the operated state, it is desirable that the engine intermittent operation is inhibited so as not to place the engine 12 into the stopped state. In the high-gear AWD mode and in the low-gear AWD mode, the engine control portion 92a inhibits switching of the engine 12 from the operated state to the stopped state.

Figure 3:
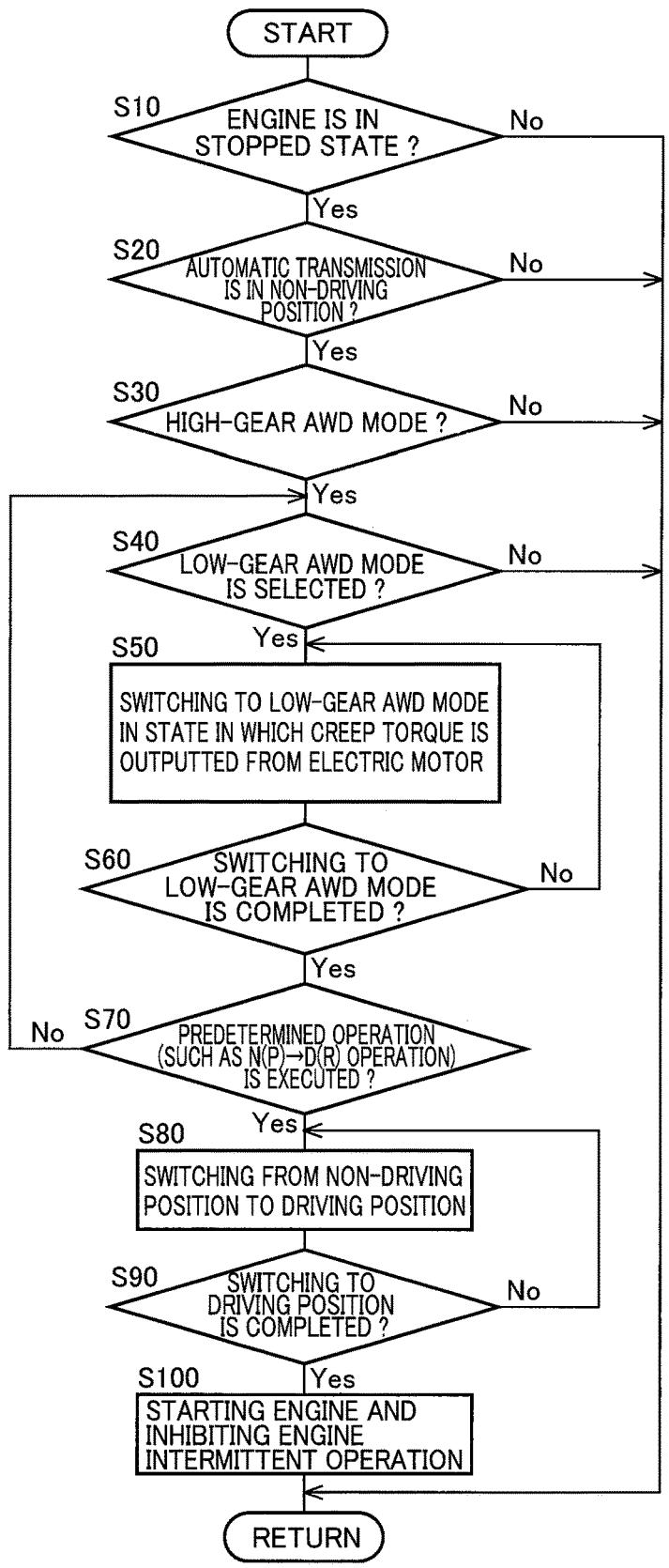
FIG. 3 is a flow chart showing a main part of a control routine executed by an electronic control apparatus, namely, a control routine that is executed for making a driver of the vehicle hardly feel uncomfortable when a low-gear AWD mode is selected.

FIG. 3 is a flow chart showing a main part of a control routine executed by the electronic control apparatus 90, namely, a control routine that is executed for making the vehicle driver hardly feel uncomfortable when the low-gear AWD mode is selected. This control routine is executed, for example, in a repeated manner.

As shown in FIG. 3, the control routine is initiated with step S10 corresponding to function of the engine control portion 92a, which is implemented to determine whether the engine 12 is in the stopped state or not. When a negative determination is made at step S10, one cycle of execution of the control routine is terminated. When an affirmative determination is made at step S10, step S20 corresponding to function of the hydraulic-pressure control portion 94 is implemented to determine whether the automatic transmission 24 is in the non-driving position or not. When a negative determination is made at step S20, one cycle of execution of the control routine is terminated. When an affirmative determination is made at step S20, step S30 corresponding to function of the driving-mode control portion 96 is implemented to determine whether the high-gear AWD mode as one of the driving modes is established or not. When a negative determination is made at step S30, one cycle of execution of the control routine is terminated. When an affirmative determination is made at step S30, step S40 corresponding to function of the driving-mode control portion 96 is implemented to determine whether the low-gear AWD mode is selected or not. When a negative determination is made at step S40, one cycle of execution of the control routine is terminated. When an affirmative determination is made at step S40, step S50 corresponding to function of the driving-mode control portion 96 is implemented to switch from the high-gear AWD mode to the low-gear AWD mode in a state in which the creep torque is being outputted from the electric motor MG. Step S50 is followed by step S60 corresponding to function of the driving-mode control portion 96, which is implemented to determine whether the switching from the high-gear AWD mode to the low-gear AWD mode has been completed or not. When a negative determination is made at step S60, the control flow goes back to step S50. When an affirmative determination is made at step S60, step S70 corresponding to function of the hydraulic-pressure control portion 94 is implemented to determine whether the N(P)→D(R) operation as the predetermined operation AMf has been executed or not. When a negative determination is made at step S70, the control flow goes back to step S40. When an affirmative determination is made at step S70, step S80 corresponding to function of the hydraulic-pressure control portion 94 is implemented to switch the automatic transmission 24 from the non-driving position to the driving position, in response to the N(P)→D(R) operation. Step S80 is followed by step S90 corresponding to function of the hydraulic-pressure control portion 94, which is implemented to determine whether the switching of the automatic transmission 24 from the non-driving position to the driving position has been completed or not. When a negative determination is made at step S90, the control flow goes back to step S80. When an affirmative determination is made at step S90, step S100 corresponding to function of the engine control portion 92a is implemented to start the engine 12 and to inhibit the engine intermittent operation so as to inhibit switching of the engine 12 from the operated state to the stopped state.

As described above, in the present embodiment, in the case in which the low-gear AWD mode is selected in the high-gear AWD mode when the engine 12 is in the stopped state with the automatic transmission 24 being in the non-driving position, the stopped state of the engine 12 is maintained until the completion of the switching from the high-gear AWD mode to the low-gear AWD mode, and the engine 12 is started after the completion of the switching from the high-gear AWD mode to the low-gear AWD mode. This control arrangement makes it possible to start the engine 12 while preventing generation of a shock, by avoiding the switching to the low-gear AWD mode and the starting of the engine 12 from being executed concurrently with each other. It is therefore possible to make the vehicle driver hardly feel uncomfortable when the low-gear AWD mode is selected.

In present embodiment, the engine 12 is started after the N(P)→D(R) operation is executed by the vehicle driver. Thus, the engine 12 is started in response to the operation of the vehicle driver which leads to starting of the engine 12, thereby making the vehicle driver hardly feel uncomfortable. Further, the engine 12 can be started prior to the acceleration requesting operation or other operation for causing the vehicle 10 to actually run, thereby making it possible to improve the drivability.

In the present embodiment, the engine 12 is started after the N(P)→D(R) operation and the acceleration requesting operation are executed by the vehicle driver, wherein the acceleration requesting operation is executed for increasing the drive force Fr after execution of the N(P)→D(R) operation. Thus, the engine 12 is started in response to the operation of the vehicle driver which leads to starting of the engine 12, thereby making the vehicle driver hardly feel uncomfortable. Further, the stopped state of the engine 12 is maintained until execution of the operation for causing the vehicle 10 to actually run, whereby the energy efficiency is improved.

In the present embodiment, the starting of the engine 12 is not initiated in the process of the switching of the automatic transmission 24 from the non-driving position to the driving position in response to the N(P)→D(R) operation, so that it is possible to avoid the switching of the automatic transmission 24 from the non-driving position to the driving position and the starting of the engine 12 from being executed concurrently with each other, and accordingly to prevent generation of the shock.

In the present embodiment, the switching from the high-gear AWD mode to the low-gear AWD mode is executed with the engine 12 being kept in the stopped state, by operation of the auxiliary-transmission dog clutch 120 in the state in which the creep torque is outputted from the electric motor MG. Therefore, the rotation of the electric motor MG makes it easier to obtain rotation required by the operation of the auxiliary-transmission dog clutch 120, so that it is possible to reliably execute the switching from the high-gear AWD mode to the low-gear AWD mode.

In the present embodiment, the switching of the engine 12 from the operated state to the stopped state is inhibited in the high-gear AWD mode and in the low-gear AWD mode. Therefore, the responsiveness of the drive force Fr can be easily obtained in the AWD mode. Further, it is possible to prevent a so-called "busy feel" that could be caused if the engine 12 is switched to the operated state immediately after being switched to the stopped state.

There will be described another embodiment of this invention. The same reference signs as used in the above-described first embodiment will be used in the following embodiment, to identify the functionally corresponding elements, and descriptions thereof are not provided.

Second Embodiment

In the above-described first embodiment, there has been described, by way of example, the case in which the control is executed, when the low-gear AWD mode is selected in the high-gear AWD mode, for making the vehicle driver hardly feel uncomfortable when the low-gear AWD mode is selected. In this second embodiment, there will be described, by way of example, a case in which the control is executed when the low-gear AWD mode is selected in the high-gear 2WD mode. It is noted that the present second embodiment may be carried out together with the above-described first embodiment.

For switching from the high-gear 2WD mode to the low-gear AWD mode, it is necessary to switch the auxiliary transmission 106 from the high gear position GSH to the low gear position GSL and to switch from the 2WD mode to the AWD mode. Therefore, even where the engine 12 is not started immediately when the low-gear AWD mode is selected in the high-gear 2WD mode, a shock could be caused by concurrent executions of the switching to the low gear position GSL and the switching to the AWD mode.

In the present second embodiment, when the low-gear AWD mode is selected in the high-gear 2WD mode with the engine 12 being in the stopped state, the driving-mode control portion 96 does not switch from the high-gear 2WD mode directly to the low-gear AWD mode but switches from the high-gear 2WD mode to the high-gear AWD mode with the engine 12 being kept in the stopped state.

Specifically, when it is determined by the engine control portion 92*a* that the engine 12 is in the stopped state, the driving-mode control portion 96 determines whether the high-gear 2WD mode as one of the driving modes is established or not. When determining that the high-gear 2WD mode is established, the driving-mode control portion 96 determines whether the low-gear AWD mode is selected or not, based on the dial-switch operation position POSdl.

When determining that the low-gear AWD mode is selected, the driving-mode control portion 96 executes switching from the high-gear 2WD mode to the high-gear AWD mode with the engine 12 being kept in the stopped state.

When the low-gear AWD mode is selected in the high-gear 2WD mode, the notification control portion 98 outputs the information-notification control command signal Sinf that is supplied to the information notification device 68, wherein the information-notification control command signal Sinf requests the information notification device 68 to notify the vehicle driver that the switching to the high-gear AWD mode has been executed and to suggest the vehicle driver to switch from selection of the low-gear AWD mode to selection of the high-gear AWD mode.

Figure 4:
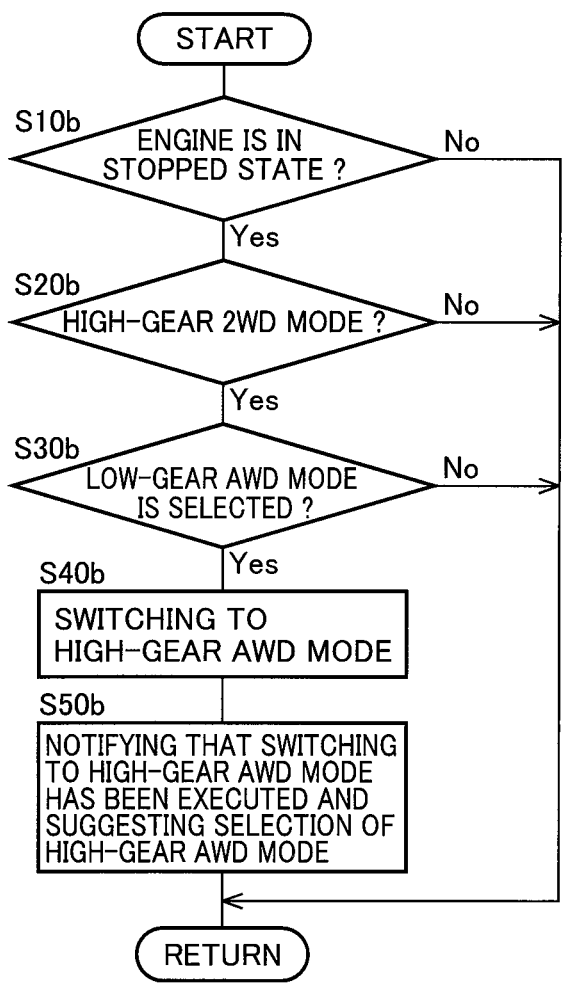
FIG. 4 is a flow chart showing a main part of a control routine executed by the electronic control apparatus, namely, a control routine that is executed for making a driver of the vehicle hardly feel uncomfortable when the low-gear AWD mode is selected, wherein the control routine is different from that shown in FIG. 3.

FIG. 4 is a flow chart showing a main part of a control routine executed by the electronic control apparatus 90, namely, a control routine that is executed for making the vehicle driver hardly feel uncomfortable when the low-gear AWD mode is selected, wherein the control routine is different from that shown in FIG. 3. This control routine is executed, for example, in a repeated manner.

As shown in FIG. 4, the control routine is initiated with step S10*b* corresponding to function of the engine control portion 92*a*, which is implemented to determine whether the engine 12 is in the stopped state or not. When a negative determination is made at step S10*b*, one cycle of execution of the control routine is terminated. When an affirmative determination is made at step S10*b*, step S20*b* corresponding to function of the driving-mode control portion 96 is implemented to determine whether the high-gear 2WD mode as one of the driving modes is established or not. When a negative determination is made at step S20*b*, one cycle of execution of the control routine is terminated. When an affirmative determination is made at step S20*b*, step S30*b* corresponding to function of the driving-mode control portion 96 is implemented to determine whether the low-gear AWD mode is selected or not. When a negative determination is made at step S30*b*, one cycle of execution of the control routine is terminated. When an affirmative determination is made at step S30*b*, step S40*b* corresponding to function of the driving-mode control portion 96 is implemented to switch from the high-gear 2WD mode to the high-gear AWD mode in a state in which the engine 12 being kept in the stopped state. Step S40*b* is followed by step S50*b* corresponding to function of the notification control portion 98, which is implemented to cause the information notification device 68 to notify the vehicle driver that the switching to the high-gear AWD mode has been executed and to suggest the vehicle driver to switch from selection of the low-gear AWD mode to selection of the high-gear AWD mode. It is noted that, in the present second embodiment, the control routine shown in FIG. 3 as well as the control routine shown in FIG. 4 may be executed.

In the present second embodiment, when the low-gear AWD mode is selected in the high-gear 2WD mode with the engine 12 being in the stopped state, the switching from the high-gear 2WD mode to the low-gear AWD mode is not executed, and the switching from the high-gear 2WD mode to the high-gear AWD mode is executed with the engine 12 being kept in the stopped state. Therefore, it is possible to avoid the switching of the auxiliary transmission 106 from the high gear position GSH to the low gear position GSL and the switching from the 2WD mode to the AWD mode from being executed concurrently with each other, and accordingly to prevent generation of the shock.

In the present second embodiment, when the low-gear AWD mode is selected in the high-gear 2WD mode, it is notified to the vehicle driver that the switching to the high-gear AWD mode has been executed, and it is suggested to the vehicle driver to switch from the selection of the low-gear AWD mode to the selection of the high-gear AWD mode. Thus, it is possible to suggest the vehicle driver to make a selection corresponding to the high-gear AWD mode that is actually established, and accordingly to suggest the vehicle driver to select the appropriate low-gear AWD mode.

While the preferred embodiments of this invention have been described in detail by reference to the drawings, it is to be understood that the invention may be otherwise embodied.

For example, in the above-described first embodiment, at step S70 of the control routine shown in the flow chart of FIG. 3, it may be determined whether the predetermined operation AMf has been executed or not, depending on not only whether the N(P)→D(R) operation has been executed or not but also whether the acceleration requesting operation has been executed or not. Further, in the control routine shown in the flow chart of FIG. 3, steps S70, S80 and S90 do not necessarily have to be implemented so that step S100 is implemented immediately when an affirmative determination is made at step S60. Even without steps S70, S80 and S90 being implemented, it is possible to avoid the switching to the low-gear AWD mode and the starting of the engine 12 from being executed concurrently with each other.

In the above-described embodiments, where the vehicle 10 is provided with a starter serving as a motor to be used exclusively for cranking the engine 12, it is possible to employ a method of starting the engine 12 by igniting the engine 12 after cranking the engine 12 by the starter, in a case in which the cranking cannot be made at all or satisfactorily by the electric motor MG, for example, due to an extremely low outside temperature when the vehicle 10 has been stopped with the MG rotational speed Nm being zero.

In the above-described embodiments, the automatic transmission 24 is an automatic transmission of a planetary gear type. However, the automatic transmission 24 may be any one of other type transmissions such as a known belt-type continuously variable transmission and a synchronous mesh twin shaft parallel axis-type automatic transmission including a known DCT (Dual Clutch Transmission).

In the above-described embodiments, the vehicle 10 is an AWD vehicle based on a 2WD vehicle of FR system, and is a parallel-type hybrid electric vehicle in which the drive power from the engine 12 and the electric motor MG is to be transmitted to the rear wheels 16 and optionally the front wheels 14. However, the present invention is applicable to also an AWD vehicle based on a 2WD vehicle of FR (front engine and rear drive) system, a hybrid electric vehicle including a known electrically-operated continuously-variable transmission, and a series-type hybrid electric vehicle in which the drive power is to be transmitted to the drive wheels, wherein the drive power is to be generated by an electric motor that is driven by an electric power of the battery and/or an electric power of the generator driven by a power of the engine. In the series-type hybrid electric vehicle, the automatic transmission may be either present or absent.

In the above-described embodiments, the AWD system does not necessarily have to be provided with the transfer 26 and the ADD mechanism 37. For example, in the AWD system, the switching may be made simply between the 2WD mode and the AWD mode, without the provision of the ADD mechanism 37. Further, in the above-described first embodiment, the AWD system may be a system in which the AWD mode is constantly established with the 2WD mode being never established. It is noted that the non-driving position of the automatic transmission 24 upon switching between the low-gear AWD mode and the high-gear AWD mode is particularly the N position of the automatic transmission 24 where switching between the low gear position GSL and the high gear position GSH is to be executed by operation of the dog clutch.

In the above-described embodiments, the fluid-type transmission device in the form of the torque converter 22 is provided in the power transmission apparatus 18. However, the provision of the torque converter 22 is not essential. For example, the fluid-type transmission device may be constituted by, in place of the torque converter 22, by another fluid-type transmission device such as a fluid coupling device without a function of torque boost effect. Moreover, the fluid-type transmission device does not necessarily have to be provided but may be replaced by a starting clutch, for example.

It is to be understood that the embodiments described above are given for illustrative purpose only, and that the present invention may be embodied with various modifications and improvements which may occur to those skilled in the art.

NOMENCLATURE OF ELEMENTS

10: vehicle (hybrid electric vehicle)
12: engine
14: front wheel (auxiliary drive wheel)
16: rear wheel (main drive wheel)
18: power transmission apparatus (vehicle power transmission apparatus)
26: transfer (drive-power distribution device)
90: electronic control apparatus (control apparatus)
92*a*: engine control portion
92*b*: electric-motor control portion
96: driving-mode control portion
98: notification control portion
106: auxiliary transmission (transmission)
120: auxiliary-transmission dog clutch (dog clutch)
MG: electric motor

What is claimed is:

1. A control apparatus for a hybrid electric vehicle that includes an engine, an electric motor, main and auxiliary drive wheels and a vehicle power transmission apparatus configured to transmit a drive power toward the main and auxiliary drive wheels, the vehicle power transmission apparatus including a drive-power distribution device configured to distribute the drive power to the main and auxiliary drive wheels, and a transmission provided in the drive-power distribution device and configured to establish a selected one of a low gear position and a high-gear position,
the control apparatus comprising:
an engine control portion configured to control an operation state of the engine; and a driving-mode control portion configured to control running of the vehicle so as to realize selected at least one of driving modes which is selected by a driver of the vehicle, wherein the driving modes include an all-wheel driving mode in which the vehicle is to run with the drive power being distributed to the main drive wheels and the auxiliary drive wheels, the all-wheel driving mode being categorized into a low-gear all-wheel driving mode in which the low gear position is established in the transmission and a high-gear all-wheel driving mode in which the high gear position is established in the transmission, and wherein, in a case in which the low-gear all-wheel driving mode is selected in the high-gear all-wheel driving mode when the engine is in a stopped state with the vehicle power transmission apparatus being in a non-driving position that disables transmission of the drive power, the engine control portion is configured to maintain the stopped state of the engine until completion of switching from the high-gear all-wheel driving mode to the low-gear all-wheel driving mode by the driving-mode control portion, and to start the engine after the completion of the switching from the high-gear all-wheel driving mode to the low-gear all-wheel driving mode.

2. The control apparatus according to claim 1,
wherein the engine control portion is configured to start the engine, after a switching operation is executed, by the driver of the vehicle, for switching from a state for selecting the non-driving position of the vehicle power transmission apparatus, to a state for selecting a driving position of the vehicle power transmission apparatus that enables the transmission of the drive power.

3. The control apparatus according to claim 1,
wherein the engine control portion is configured to start the engine, after a switching operation and an acceleration requesting operation are executed by the driver of the vehicle, the switching operation being executed for switching from a state for selecting the non-driving position of the vehicle power transmission apparatus, to a state for selecting a driving position of the vehicle power transmission apparatus that enables the transmission of the drive power, the acceleration requesting operation being executed for increasing the drive power after execution of the switching operation.

4. The control apparatus according to claim 2,
wherein the engine control portion is configured to not initiate starting of the engine in process of switching of the power transmission apparatus from the non-driving position to the driving position in response to the switching operation.

5. The control apparatus according to claim 1, further comprising an electric-motor control portion that is configured to cause the electric motor to output a predetermined torque causing a creep phenomenon in the high-gear all-wheel driving mode when the engine is in the stopped state,
wherein the driving-mode control portion executes switching from the high-gear all-wheel driving mode to the low-gear all-wheel driving mode with the engine being kept in the stopped state, by switching the transmission from the high gear position to the low gear position by operation of a dog clutch provided in the transmission in a state in which the predetermined torque is outputted from the electric motor.

6. The control apparatus according to claim 1,
wherein the engine control portion is configured to inhibit switching of the engine from an operated state to the stopped state in the high-gear all-wheel driving mode and in the low-gear all-wheel driving mode.

7. The control apparatus according to claim 1,
wherein the driving modes include a main-drive-wheel driving mode in which the vehicle is to run with the drive power being distributed to the main drive wheels, the main-drive-wheel driving mode including a high-gear main-drive-wheel driving mode in which the high gear position is established in the transmission, and
wherein the driving-mode control portion is configured, when the low-gear all-wheel driving mode is selected in the high-gear main-drive-wheel driving mode with the engine being in the stopped state, to not switch from the high-gear main-drive-wheel driving mode to the low-gear all-wheel driving mode, and to switch from the high-gear main-drive-wheel driving mode to the high-gear all-wheel driving mode with the engine being kept in the stopped state, for avoiding switching from the high gear position to the low gear position and switching from the main-drive-wheel driving mode to the all-wheel driving mode from being executed concurrently with each other.

8. The control apparatus according to claim 7, further comprising a notification control portion configured, when the low-gear all-wheel driving mode is selected in the high-gear main-drive-wheel driving mode, to notify the driver of the vehicle that switching to the high-gear all-wheel driving mode has been executed, and to suggest the drive of the vehicle to switch from selection of the low-gear all-wheel driving mode to selection of the high-gear all-wheel driving mode.

9. The control apparatus according to claim 1,
wherein, in the case in which the low-gear all-wheel driving mode is selected in the high-gear all-wheel driving mode when the engine is in the stopped state with the vehicle power transmission apparatus being in the non-driving position, the engine control portion is configured to avoid the switching from the high-gear all-wheel driving mode to the low-gear all-wheel driving mode and starting of the engine from being executed concurrently with each other, by maintaining the stopped state of the engine until the completion of switching from the high-gear all-wheel driving mode to the low-gear all-wheel driving mode.

10. The control apparatus according to claim 1,
wherein the vehicle power transmission apparatus includes an automatic transmission disposed in a power transmission path between a drive power source and the drive-power distribution device, the drive power source including the engine and the electric motor, and
wherein, in the case in which the low-gear all-wheel driving mode is selected in the high-gear all-wheel driving mode when the engine is in the stopped state with the automatic transmission of the vehicle power transmission apparatus being in the non-driving position that disables the transmission of the drive power to the main and auxiliary drive wheels through the drive-power distribution device, the engine control portion is configured to maintain the stopped state of the engine until the completion of the switching from the high-gear all-wheel driving mode to the low-gear all-wheel driving mode.

11. The control apparatus according to claim 1,
wherein, when the all-wheel driving mode is established, the vehicle runs, with the drive power being distributed to the main drive wheels from a drive power source that includes the engine and the electric motor, and with the drive power being distributed to the auxiliary drive wheels from the same drive power source.

12. The control apparatus according to claim 1,
wherein the drive-power distribution device includes a first output shaft through which the drive power is to be transmitted toward the main drive wheels, a second output shaft through which the drive power is to be transmitted toward the auxiliary drive wheels, and a power-distribution clutch that is to be placed in a selected one of a main-drive-wheel driving state and an all-wheel driving state, such that, when the power-distribution clutch is placed in the main-drive-wheel driving state, the second output shaft is allowed to be rotated relative to the first output shaft whereby the drive power transmitted to the first output shaft is disabled to be transmitted to the second output shaft, and such that, when the power-distribution clutch is placed in the all-wheel driving state, the second output shaft is inhibited from being rotated relative to the first output shaft whereby the drive power transmitted to the first output shaft is enabled to be transmitted to the second output shaft, wherein, when the main-drive-wheel driving mode is selected, the power-distribution clutch of the drive-power distribution device is placed in the main-drive-wheel driving state whereby the drive power is enabled to be distributed to the main drive wheels while being disabled to be distributed to the auxiliary drive wheels, and wherein, when the all-wheel driving mode is selected, the power-distribution clutch of the drive-power distribution device is placed in the all-wheel driving state whereby the drive power is enabled to be distributed to the auxiliary drive wheels as well as to the main drive wheels.

* * * * *